United States Patent [19]

Brendle

[11] Patent Number: 5,579,930

[45] Date of Patent: Dec. 3, 1996

[54] RACK SYSTEM

[76] Inventor: Douglas E. Brendle, 1875 Milton Dr., Cheyenne, Wyo. 82001

[21] Appl. No.: 443,813

[22] Filed: May 18, 1995

[51] Int. Cl.$^6$ ........................................... A47F 5/08
[52] U.S. Cl. ..................... 211/151; 211/59.2; 280/79.3
[58] Field of Search .................... 211/151, 59.2; 280/79.3

[56] References Cited

U.S. PATENT DOCUMENTS

| | | |
|---|---|---|
| 515,163 | 2/1894 | Pauly, Jr. et al. ................. 211/151 |
| 870,835 | 11/1907 | Loew ............................. 280/79.3 X |
| 2,502,818 | 4/1950 | Bocchino ......................... 211/151 X |

*Primary Examiner*—Ramon O. Ramirez
*Assistant Examiner*—Michael J. Turgeon
*Attorney, Agent, or Firm*—Dean P. Edmundson

[57] ABSTRACT

A rack system for supporting screen frames in vertically-spaced horizontal shelves. Each shelf includes sloped or stepped support surfaces which accommodate screen frames of any width and which minimize surface contact and friction between the screen frame and the support surface of the rack without adjustment. Wheels can be included under the rack to enable the rack to be used as a cart for transporting screen frames from one location to another. Side wall panels and a door can be included to enclose the structure. This enables the atmosphere inside the enclosure to be controlled.

19 Claims, 4 Drawing Sheets

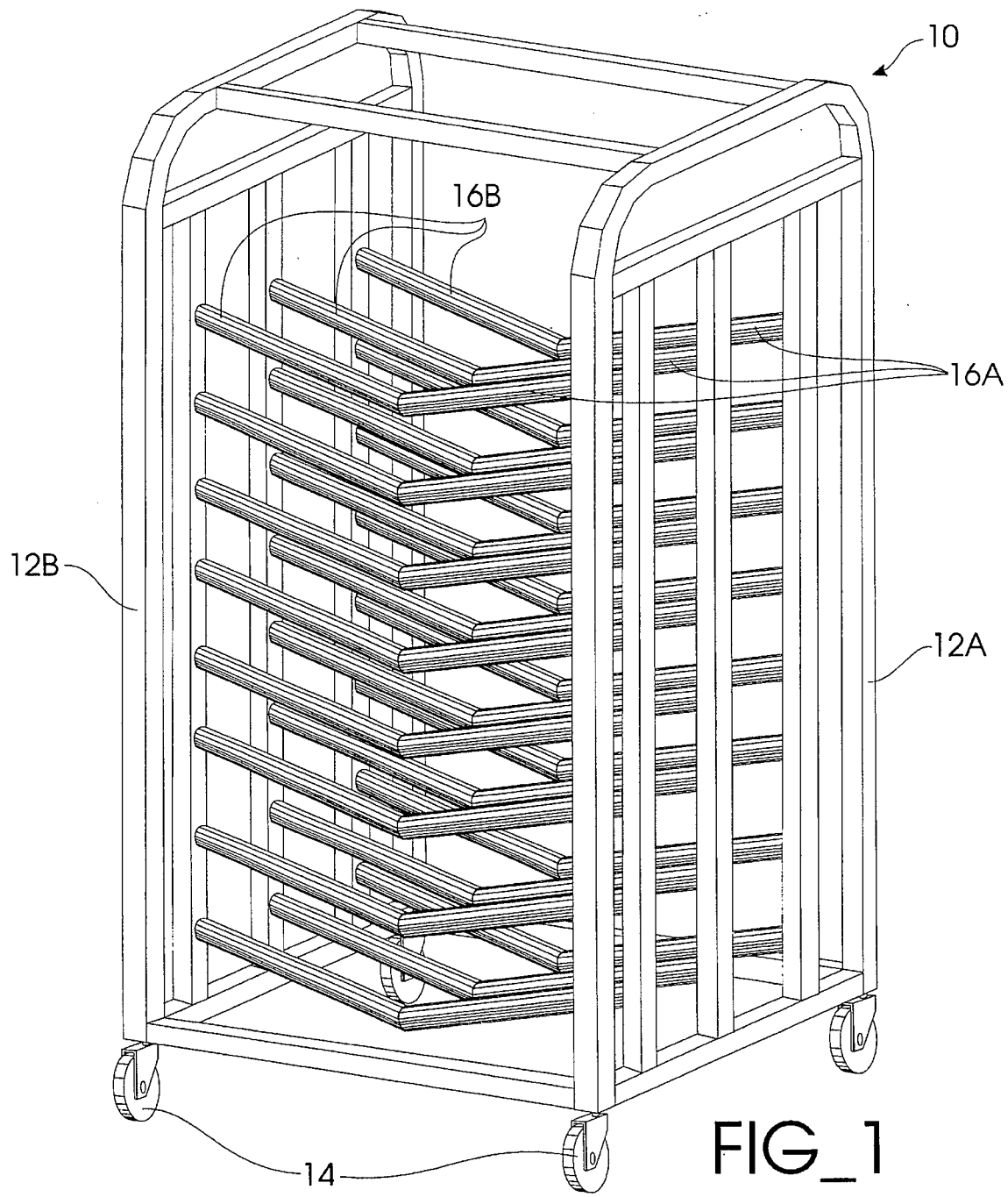
FIG_1

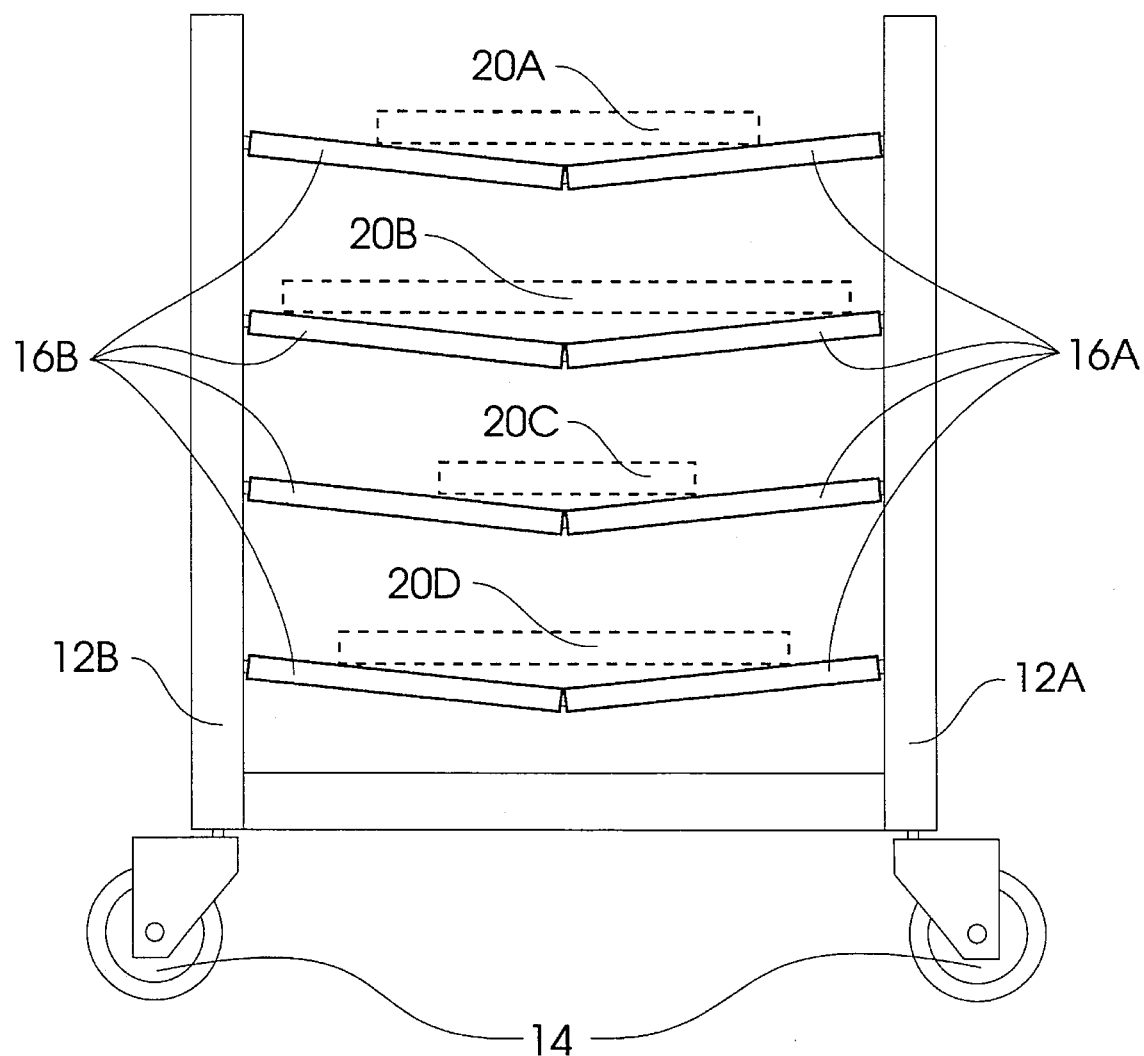
FIG_2

FIG_3
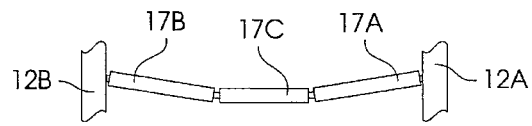
FIG_4
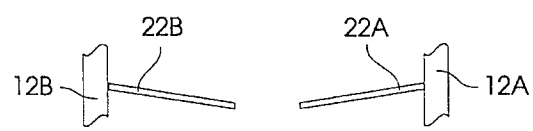
FIG_5
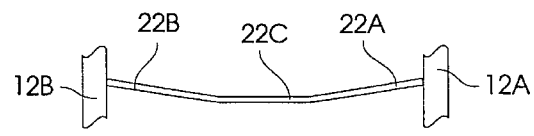
FIG_6
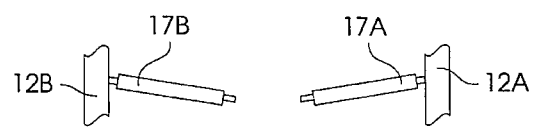
FIG_7
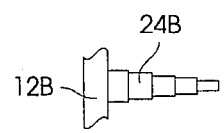
FIG_8
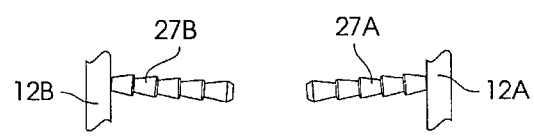
FIG_9
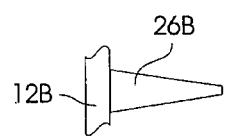
FIG_10

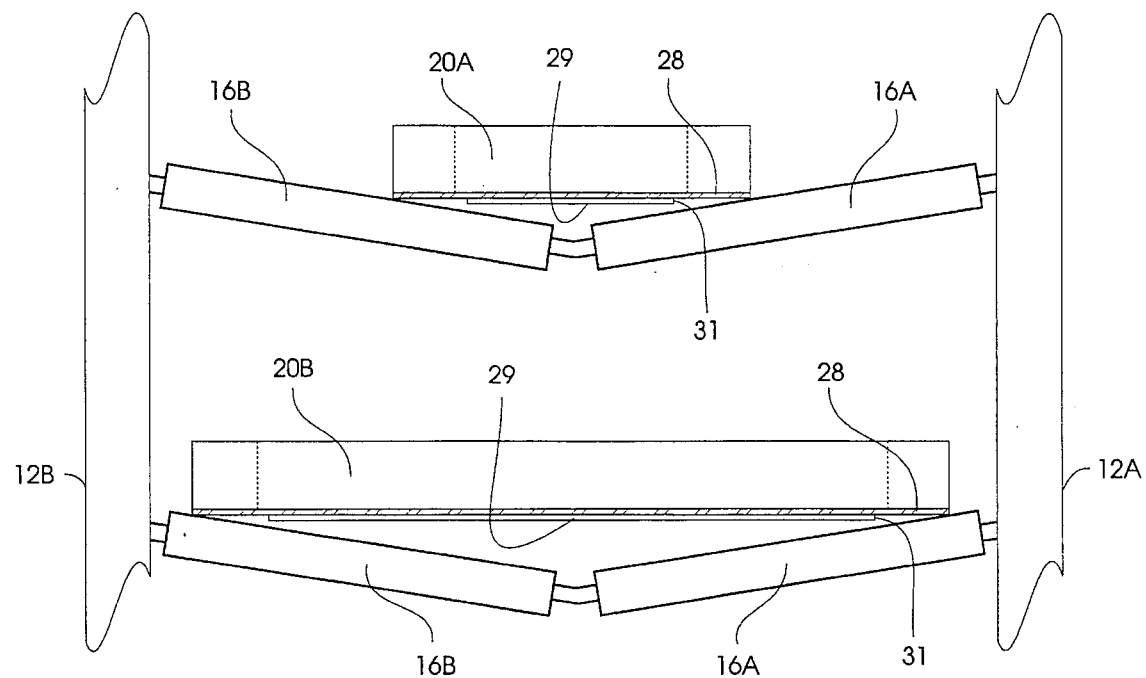
FIG_11
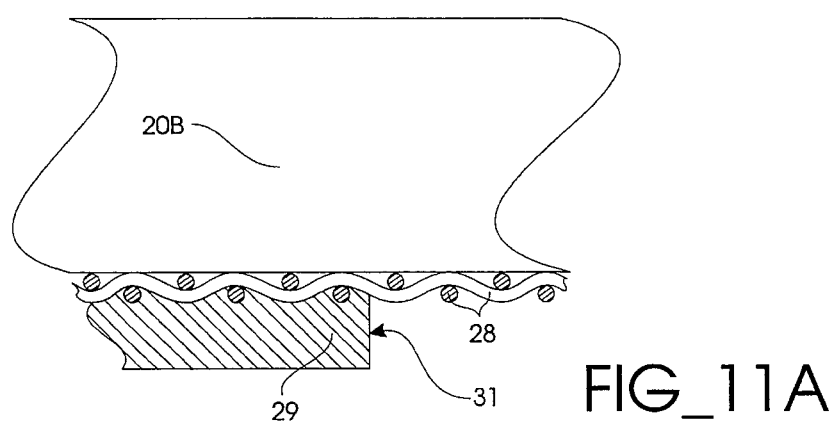
FIG_11A

RACK SYSTEM

FIELD OF THE INVENTION

This invention relates to racks and support surfaces for screen frames to which printing screen meshes are attached.

BACKGROUND OF THE INVENTION

Screen frames are commonly used in the printing industry. A printing screen (e.g., a silk screen) is stretched tightly over the frame and is then secured to the frame. The screen includes a desired image or pattern to be printed. In order to obtain the desired image or pattern on the screen, the screen is coated with a liquid emulsion which must be dried before the screen can be used for printing.

In order to dry the emulsion properly, the screen (secured to its own frame) must be supported (with the screen side down) in a horizontal plane.

A properly-coated screen must have an emulsion profile which is "proud", i.e., it is higher than the surface of the screen/mesh which carries it. The thickness of the emulsion over the screen should be a minimum of four microns on the substrate or transfer side of the screen printing frame. This minimum thickness of dried emulsion over the screen/mesh is to create a wall that defines the edges of the image, thereby making a stencil. The stencil will then determine the shape of the ink being transferred. The stencil's thickness over the mesh also acts as a stilt to suspend the mesh above and away from the substrate or material to be printed. It is important that the mesh not be permitted to make contact with the substrate or else the threads of the mesh will influence the shape of the ink deposited. This would be highly undesirable. The mesh is intended to be merely the carrier of the stencil. The thickness of the emulsion on the mesh is achieved through proper coating technique and is secured by proper drying position.

The frame must be dried with the screen or mesh side down to allow the force of gravity to pull and hold the liquid emulsion below the mesh while drying. If the mesh is dried while on the top side of the frame, gravity will pull and force the emulsion in its liquid state to flow down through the mesh to its bottom side inside the frame. This is undesirable because if the emulsion is on the backside of the mesh it will not allow the ink squeegee to make surface-to-surface contact with the mesh during its transfer stroke. If the ink is not cut off at the top of the mesh it will not be free to transfer and stay with the substrate when the screen is lifted off the substrate. The result is unfortunately a misprint.

The minimum thickness of the emulsion on the mesh should be four microns because the average larger particle size of most ink systems is four microns.

Conventional racks which have been used for supporting screen frames include flat ledges in a horizontal plane on opposite sides of an upright frame. However, there are a number of disadvantages associated with the use of such racks. For example, if the width of the screen frame is less than the distance between the ledges on the opposite sides of the rack, then the screen frame cannot be supported by the rack at all. Thus, racks of different sizes are required in order to accommodate screen frames of different widths. Also, if the ledges on the racks are too wide, the emulsion coated on the screen will touch the ledges. This is very undesirable because the screen can become bonded to the ledges when the emulsion dries. Furthermore, even if the screen doesn't become bonded to the ledges, the image area on the screen will be ruined in areas where it is contacted by the ledges. Moreover, where the screen contacts the ledges, water cannot evaporate from the screen.

Conventional racks have flat level ledges about one to two inches wide. This allows only one size frame to be accommodated on a given rack. Surface-to-surface contact between the flat ledges and the screen frame traps moisture, thereby inhibiting evaporation of water or chemicals.

The large amount of surface contact between the screen frame and the ledges also creates significant friction between the screen frame and the ledges when the frame is slid into the rack. This friction wears and weakens the mesh, allowing it to break easily and prematurely. The edges of the ledges can also tear the mesh immediately and render it useless.

There has not heretofore been provided a rack system which can safely and effectively support a variety of screen frames of various widths.

SUMMARY OF THE INVENTION

In accordance with the present invention there is provided a rack system for safely and efficiently supporting a plurality of screen frames regardless of the width of the screen frames. In a preferred embodiment the rack system comprises an upright frame having upright sides. A plurality of vertically-spaced ledges or shelves are supported by the sides of the frame. The ledges or shelves angle or slope downwardly from each side so as to provide a plurality of support surfaces for a screen frame.

Thus, the side edges of a screen frame can be supported on any of the shelves, regardless of the width of the screen frame. Also, there is only minimal contact between the side edges of the screen frame and the shelf. This avoids the problem associated with prior racks where the emulsioned area of the screen can be ruined by contacting flat ledges. Further, the open sides of the rack enable a screen to dry much more efficiently than is the case with conventional racks.

Because the rack of the present invention can safely and efficiently support screen frames of a wide variety of widths, it is not necessary to purchase numerous racks in order to support screen frames of different widths.

With the use of rounded surfaces on the ledges, friction between the mesh and the ledges is minimized and the life of the mesh is prolonged. With the use of rollers or sleeves on the ledges, friction between the mesh and the ledges is eliminated. Use of rollers or rods for the ledges or shelves (as opposed to elongated flat ledges) allows the maximum air flow throughout the rack, thereby speeding the drying process.

By including wheels on the underside of the rack, the rack becomes mobile and can be easily moved from one location to another.

Other advantages of the rack system of the invention will be apparent from the following detailed description.

BRIEF DESCRIPTION OF THE DRAWINGS

The invention is described in more detail hereinafter with reference to the accompanying drawings, wherein like reference characters refer to the same parts throughout the several views and in which:

FIG. 1 is a front perspective view of one embodiment of rack system of the invention;

FIG. 2 is a front elevational view of the rack shown in FIG. 1;

FIG. 3 is a front elevational view of another embodiment of rack system of the invention;

FIG. 4 is a front elevational view of another embodiment of shelf system which is useful in this invention;

FIG. 5 is a front elevational view of another embodiment of shelf system which is useful in this invention;

FIGS. 6–10 front elevational views of other embodiments of shelf systems which are useful in this invention; and FIGS. 11 and 11A are front elevational views illustrating use of the rack system to support screen frames for drying emulsion on the mesh.

DETAILED DESCRIPTION OF THE INVENTION

In FIGS. 1 and 2 there is shown one embodiment of rack system 10 of the invention comprising an upright frame having opposing sides 12A and 12B. Preferably there are also wheels 14 under the frame to enable the rack to be easily moved from one location to another. If desired, the frame may include side panels and a door to enclose the structure. This enables the atmosphere inside the enclosure to be controlled. The enclosed structure can also be used as a storage cabinet for screen frames to protect them from dust and other contaminants.

Supported between the upright sides of the frame are a plurality of vertically-spaced shelves or ledges. In this embodiment each shelf comprises a number of right rollers 16A and a corresponding number of left rollers 16B. Each roller is sloped or angled downwardly from the side of the frame toward the center of the rack. Preferably the rollers are freely rotatable about their own axis so that a screen frame which being placed on or removed from a shelf rolls along with a minimum amount of friction between the screen frame and the rollers.

There may be any desired number of shelves in the rack. The width of the rack may also vary as desired. The number of rollers in each shelf may also vary. Preferably there are two sets of rollers for each shelf (a front set and a rear set), and there may be additional sets of rollers in each shelf between the front and rear sets of rollers.

The rack system 10 can easily accommodate screen frames of different widths, as illustrated in FIG. 2. Thus, each screen frame 20A, 20B, 20C and 20D of a different width can be readily supported on a shelf in the rack system, with only minimal contact between the side edges of the screen frame and the rollers.

The extent of slope of each roller from the side of the frame toward the center of the rack may vary. Preferably the extent of slope of each right side roller 16A is similar to that of the corresponding left side roller 16B.

Another embodiment of rack system of the invention is shown in FIG. 3 where each shelf comprises a round rod having downward sloping right and left sections 22A and 22B, respectively, and may be connected by a horizontal section 22C (as shown in FIG. 6). If desired, the rod may be replaced with right and left rollers 17A and 17B and a center roller 17C, as shown in FIG. 4. FIG. 5 is a front elevational view which illustrates that the sloping right and left sections 22A and 22B may be separate components which do not extend completely to the center of the rack. FIG. 7 illustrates that the sections 17A and 17B may also be separate components.

FIG. 8 shows yet another embodiment of shelf system useful in this invention comprising stepped-down rollers 24A and 24B. Because the rollers include sections of progressively decreasing diameter, the rollers provide a plurality of support surfaces for the opposing edges of a plurality of screen frames of different widths. Preferably the rollers 24A and 24B are of the same size and shape.

FIG. 9 shows yet another embodiment of shelf system which is useful in the rack system. The shelf system comprises another style of stepped down rollers 27A and 27B.

FIG. 10 is a front elevational view of another embodiment of shelf system useful in this invention comprising tapered rollers 26A and 26b. The diameters of the rollers decrease along their length from their outer ends to their inner ends.

FIG. 11 and 11A are front elevational views of the rack of FIG. 2 showing screen frames 20A and 20B on shelves of one embodiment of the rack. On the lower side of each screen frame is the mesh 28. Coated on the mesh is an emulsion 29. The edge 31 of the emulsion illustrates the manner in which the emulsion serves as a stencil.

Other variants are possible without departing from the scope of this invention. For example, means may be included to enable the rollers or rods of each shelf to be vertically adjustable so that the vertical spacing between adjacent shelves can be varied as desired. Also, the rods or rollers for a given shelf can be tilted slightly toward the rear of the rack, if desired.

The use of spaced rollers or rods for each shelf as described herein enables the air to move very freely through the rack to dry emulsions on each of the meshes. Conventional racks with elongated shelves along each side do not enable air to move through the rack as freely as is possible with the rack of this invention.

What is claimed is:

1. A rack for supporting a screen frame to one side of which a printing screen mesh is attached; wherein said screen frame includes opposing sides; wherein the rack comprises:

(a) an upright frame;

(b) a plurality of vertically-spaced shelves supported by said upright frame; wherein each said shelf comprises a plurality of roller systems each having first and second ends; wherein said first end of each said roller system is rotatably supported by said upright frame and provides a first support surface for said opposing sides of said screen frame; wherein said second end of each said roller system provides a second support surface; and wherein said first support surfaces is higher than said second support surface.

2. A rack in accordance with claim 1, wherein each said shelf comprises left and right rollers which are sloped downwardly towards each other.

3. A rack in accordance with claim 2, wherein each said roller includes first and second ends, wherein said first end of each roller is rotatably supported by said upright frame; and wherein said second end of each said roller is lower than said first ends of said rollers.

4. A rack in accordance with claim 3, wherein each said roller comprises a sleeve rotatably mounted on a rod which slopes downwardly from said upright frame.

5. A rack in accordance with claim 2, further comprising a center roller between said left and right rollers.

6. A rack in accordance with claim 1, wherein each said shelf comprises left and right rollers each having first and second ends, wherein said second end of each said roller has a smaller diameter than said first end thereof.

7. A rack in accordance with claim 6, wherein each said shelf comprises left and right rollers which include stepped down support surfaces.

8. A rack in accordance with claim 6, wherein each said shelf comprises left and right rollers which are tapered.

9. A rack in accordance with claim 1, further comprising wheels mounted to said upright frame.

10. A rack for supporting a screen frame to which a printing screen is attached; wherein said screen frame includes opposing sides; wherein the rack comprises:
   (a) an upright frame;
   (b) a plurality of vertically-spaced shelves supported by said upright frame; wherein each said shelf comprises left and right rollers each having first and second ends; wherein said rollers are rotatably mounted at their first ends to said upright frame; wherein said second ends of said rollers are lower than said first ends.

11. A rack in accordance with claim 10, further comprising wheels mounted to said upright frame.

12. A rack in accordance with claim 10, wherein each said roller comprises a sleeve rotatably mounted on a rod which slopes downwardly from said upright frame.

13. A rack in accordance with claim 12, further comprising a center roller between said left and right rollers.

14. A rack in accordance with claim 10, wherein said left and right rollers include stepped down support surfaces.

15. A rack for supporting a screen frame to which a printing screen is attached; wherein said screen frame includes opposing sides; wherein the rack comprises:
   (a) an upright frame;
   (b) a plurality of vertically-spaced shelves supported by said upright frame; wherein each said shelf comprises rod means attached to said upright frame and providing a first support surface for said opposing sides of said screen frame; wherein said rod means provides a second support surface; and wherein said first support surface is higher than said second support surface.

16. A rack in accordance with claim 15, wherein said upright frame includes upright sides, and wherein said rod means extends between said upright sides.

17. A rack in accordance with claim 16, wherein said rod means includes left and right portions which extend downwardly at an angle toward each other.

18. A rack in accordance with claim 15, wherein said upright frame includes upright sides, and wherein said rod means comprises left and right rod members each attached to a respective one of said upright sides; and wherein said rod members slope downwardly towards each other.

19. A method for supporting a plurality of screen frames in vertically-spaced horizontal planes, the method comprising the steps of:
   (a) providing a rack comprising:
      (i) an upright frame;
      (ii) a plurality of vertically-spaced shelves supported by said upright frame; wherein each said shelf comprises support means providing a first support surface for opposing sides of a screen frame and a second support surface; wherein said first support surface is higher than said second support surface;
   (b) supporting each said screen frame on a respective one of said shelves in a horizontal plane.

* * * * *